United States Patent
Lee et al.

(10) Patent No.: US 6,804,630 B2
(45) Date of Patent: Oct. 12, 2004

(54) METHOD FOR MEASURING QUANTITY OF USAGE OF CPU

(75) Inventors: Sang Ho Lee, Seoul (KR); Jang Keun Oh, Suwon (KR)

(73) Assignee: LG Electronics Inc., Seoul (KR)

( * ) Notice: Subject to any disclaimer, the term of this patent is extended or adjusted under 35 U.S.C. 154(b) by 228 days.

(21) Appl. No.: 09/930,447

(22) Filed: Aug. 16, 2001

(65) Prior Publication Data

US 2002/0026291 A1 Feb. 28, 2002

(30) Foreign Application Priority Data

Aug. 28, 2000 (KR) .......................................... 2000-50037

(51) Int. Cl.⁷ .............................................. G06F 15/00
(52) U.S. Cl. .......................................... 702/186; 710/22
(58) Field of Search .................... 702/123, 176–178, 702/179, 182, 183, 186, 187, 189; 709/100, 102, 104, 105; 714/38; 707/10; 710/22, 25, 46, 48

(56) References Cited

U.S. PATENT DOCUMENTS

| | | | | |
|---|---|---|---|---|
| 5,463,775 A | * | 10/1995 | DeWitt et al. | 702/186 |
| 5,797,115 A | * | 8/1998 | Fuller | 702/186 |
| 6,003,061 A | * | 12/1999 | Jones et al. | 709/104 |
| 6,006,248 A | * | 12/1999 | Nagae | 709/105 |
| 6,009,452 A | * | 12/1999 | Horvitz | 709/102 |
| 6,049,798 A | * | 4/2000 | Bishop et al. | 707/10 |
| 6,092,095 A | * | 7/2000 | Maytal | 709/100 |
| 6,434,714 B1 | * | 8/2002 | Lewis et al. | 714/38 |
| 6,542,940 B1 | * | 4/2003 | Morrison et al. | 710/22 |

OTHER PUBLICATIONS

WinTasks 4 Professional User's Manual (no date).*
SmartLine Inc., Dec. 14, 1999, Remote Task Manager*

* cited by examiner

Primary Examiner—Marc S. Hoff
Assistant Examiner—Mohamed Charioui
(74) Attorney, Agent, or Firm—Fleshner & Kim, LLP

(57) ABSTRACT

The present invention relates to a method for measuring a quantity of usage of a CPU, in particular to a method for measuring a quantity of usage of a CPU which is capable of getting a credible quantity of usage of a CPU without amending an algorithm in order to adapt it to the an operating system, e.g., MS-Windows System, or requiring a complicated code. The method uses various algorithms provided by the operating system on the behalf of a registry storing a quantity of usage of a CPU inside a system. Accordingly the present invention can measure a quantity of usage of a CPU easily without lowering a performance of the operating system.

29 Claims, 2 Drawing Sheets

METHOD FOR MEASURING QUANTITY OF USAGE OF CPU

BACKGROUND OF THE INVENTION

1. Field of the Invention

The present invention relates to a method for measuring a quantity of usage of a device, in particular, to a method for measuring a quantity of usage of a CPU.

2. Background of the Related Art

There are various kinds of algorithms for predicting a quantity of usage of a system in the related art. In general, more complicated algorithms yield more credible predictions; less complicated algorithms yield less credible predictions.

In addition, a method for calculating a quantity of usage of a CPU can be differentiated in accordance with an operating system. For example, in a MS-Windows 9x system, system usage of a CPU is updated by the CPU itself using its own algorithm. However, it is recommended to use the registry information when an application program is developed.

Furthermore, because an Operating System (OS) kernel takes charge of the CPU multi-tasking in all threads in a present ready-to-run state, the OS kernel generally knows whether there are OS threads in the ready-to-run state or an action state (all threads do not wait for certain event to resume execution). For example, when the OS determines there are no threads in the ready-to-run state, a value of a power management timer is read, and the CPU is maintained in sleep mode. In this mode the power management timer operates independently from the CPU, and measures accurately time duration of reads (regular increase with a fixed rate of 3.579545 Mhz). After that, the OS reads the value of the power management timer when the CPU is waken up.

In addition, measuring time difference between initial timer read in the sleep mode of the CPU and second timer read in the wake mode is a measure of idle time of the CPU. In other words, the CPU idle time can be measured by dividing a total of the difference between the second timer and initial timer for a large sampling interval, by the sampling interval. It can be described as in Equations 1 and 2, Idle Ticks=Sum (across sampling interval)[Second Timer Read−Initial Timer Read]  [Equation 1]

CPU Idle(%)=Idle Ticks×Tick Period(s)/Sampling Interval(s)×100%  [Equation 2]

Herein, the first timer read describes a processor in sleep mode (initial timer read), and the second timer read describes the CPU is in the wake mode.

In contrast, related art algorithms yield large values of CPU usage, even though the system does not perform an operation. In addition, in the related art, there is no time interval information available for updating a quantity of usage of a CPU, accordingly it is not appropriate for measuring a quantity of usage of a CPU in short time. In addition, in the related art, because an algorithm has to be amended in order to adapt it to the MS-Windows system or a complicated code is required, it degrades the MS-Windows system performance.

SUMMARY OF THE INVENTION

An object of the invention is to solve at least the above problems and/or disadvantages and to provide at least the advantages described hereinafter.

An object of the present invention is to provide a method for measuring a quantity of usage of a CPU which is capable of getting directly a result by using various functions provided by the operating system on the behalf of a registry storing a quantity of usage of a CPU inside the system.

In order to achieve the object of the present invention, the method for measuring a quantity of usage of the CPU comprises reading execution time of all threads excluding a system thread with a known time interval, adding the values, subtracting a total of the execution time of the former stored thread from the grand total, and measuring a quantity of usage of a CPU by dividing the subtracted execution time by the known time interval.

To achieve at least the above objects and advantages in a whole or in parts and in accordance with the purpose of the present invention, as embodied and broadly described, a method for measuring a quantity of usage of a CPU in a system, including reading execution time of all threads excluding a system thread with a certain timer time interval, adding the read values, subtracting a total of execution time of the former stored thread from the grand total, and measuring a quantity of usage of a CPU by dividing the subtracted execution time of the thread by the certain timer time.

To further achieve at least the above objects and advantages in a whole or in parts and in accordance with the purpose of the present invention, as embodied and broadly described, a method for measuring CPU usage, including reading an execution time of a thread over a time interval, adding the execution times to obtain a grand total, reading a total execution time for a previously stored thread, subtracting the total execution time for the previously stored thread from the grand total to obtain a result, and outputting the result.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
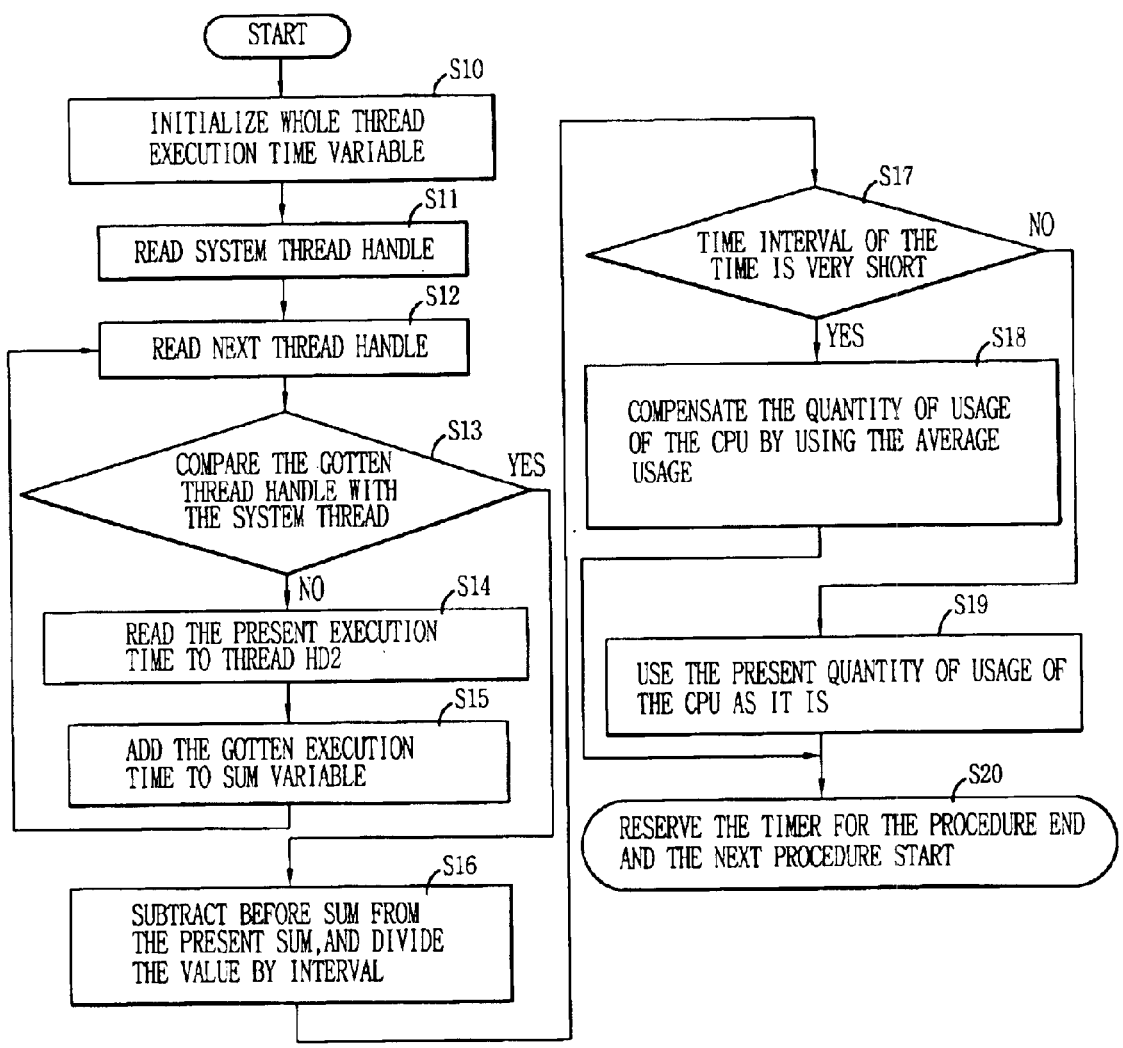
FIG. 1 is a detailed flow chart illustrating a method for measuring a quantity of usage of a CPU in accordance with an embodiment of the present invention.

Hereinafter, a thread and a handle in accordance with the present invention will be described, and an embodiment in accordance with the present invention will now be described in detail with reference to accompanying FIGS. 1 and 2. First, a thread used in a Windows system is an execution unit in an application program. The each thread is combined with CPU commands, and a set of CPU registers, stacks, etc.

In the Windows OS, a process can have several threads, and the thread can make other threads again. In the meantime, a kernel as the core of the Windows OS uses a service called a scheduler allocating CPU time to each execution thread. When a process is getting made, the system makes automatically one thread for the process. The thread is called a 'basic thread' of the process, the basic thread can make additional threads, and the each additional thread can make threads also.

In addition, in the Windows system, it is not possible to approach the kernel, a Graphic Device Interface (GDI) or other object directly, but it is possible through a handle. In general, because the objects have mobility in a memory by a memory manager of the Windows, it is possible to search and approach the objects only through their handles.

A first embodiment in accordance with the present invention will now be described in detail with reference to accompanying FIGS. 1 and 2. FIG. 1 is a detailed flow chart illustrating a method for measuring a quantity of usage of a CPU in accordance with a preferred embodiment of the present invention. In other words, a quantity of usage of a CPU is calculated by using a system service provided from MS-Windows. In Windows, a VMM (Virtual Machine Manager) service usable in an embodiment of a VDD (Virtual Device Driver) is provided. In other words, a service related to a timer and threads is used in the VMM service, and preferably operating at a ring 0 level.

In general, a program operated in the system is classified as a thread, and the thread is a minimum unit of execution. Herein, the execution means the CPU is used. As described in FIG. 1, a variable (SUM) storing the sum of the execution time of all threads excluding the system thread is initialized as in step S10. A handle value Hd1 is then read as a pointer of the system thread in step S11, and the next thread handle value Hd2 is read in step S12. After reading the handle value Hd1 of the system thread and handle value Hd2 of the next thread, they are compared in step S13 to determine whether the read values are the same. In other words, it is judged whether the all thread values have been read by comparing the handle value read most recently with the handle value of the system thread.

Herein, the thread handles are executed repeatedly by scheduling of the operating system. The operating system also manages information about the thread and execution of it. In addition, Windows has the VMM service information about the thread execution. For example, the VMM service comprises a function (Get_Sys_Thread_Handle) finding a handle of the first thread (system thread), a function (Get_Next_Thread_Handle) finding a handle of the next thread, and a function (_GetThreadExecTime) finding execution time after a thread generation etc.

After that, in the comparing process of step S13 of the thread handle, when the thread handle value of the system is different from the next thread handle value, execution time of the next thread handle up to the present is read in step S14. The execution time is then added to the variable SUM in step S15. In judging whether the all thread handles are read by comparing the read values, when the thread handle value of the system is different from the next thread handle value, the above-mentioned process is performed repeatedly until the next thread value approaches to the thread handle value of the system.

When the thread handle value of the system is the same as the last thread handle value, the execution time of the all thread handles excluding the handle value of the system thread is stored in the variable SUM. Accordingly, the sum execution time (before SUM) of the thread handles stored formerly is subtracted from the total execution time (present SUM) of the thread handles stored in the variable SUM, and the subtracted value is divided by the time interval at step S16. Herein, the value divided by the time interval is a quantity of usage of a CPU (CPU_USAGE).

For example, when the total execution time of the formerly stored thread handles is 100 seconds and the total execution time of the present thread handles is 105 seconds after a 10 second interval, a value found by dividing 10 seconds by 5 seconds as the ratio between the execution time (100 seconds) of the former stored thread handle and the execution time (105 seconds) of the present execution thread handle is 50% as the quantity of usage of the CPU (CPU_USAGE). In other words, the execution time for the interval is found by calculating a total of the execution time of all the thread handles excluding the handle of the system thread at each interval by using the VMM service, and subtracting the former calculated total execution time from the grand total. And, a quantity of usage of a system is measured by dividing the found execution time for the interval by the interval.

In the meantime, when the interval is set shorter, the calculated quantity of usage of the CPU shows more sudden change than a case when the interval is set longer, in order to decrease the sudden variation, a quantity of usage of a CPU is compensated by finding an average value between the former calculated quantities of usage of a CPU (CPU_USAGE_PREV) and the present calculated quantity of usage of a CPU (CPU_USAGE_NOW) in step S18. In other words, when the interval is short in step S17, the calculated quantity of usage of the CPU shows a sudden variation. It shows sudden variation also however, in an application construction responding sensitively in accordance with a quantity of usage of a CPU. Accordingly, the above-described sudden variation of the calculated quantity of usage of the CPU can be prevented by compensating the calculated quantity of usage of the CPU. On the contrary, when the interval is sufficiently long, the calculated quantity of usage of the CPU is maintained as it is in step S19. The total procedure ends after storing the usage values and reserving the time for the next procedure.

Figure 2:
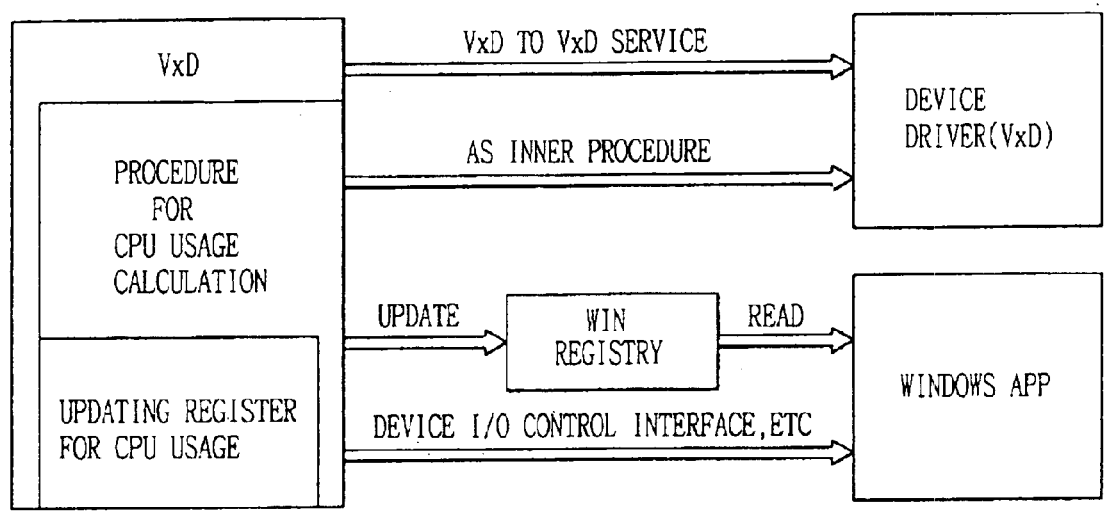
FIG. 2 illustrates an interface between a procedure for calculating a quantity of usage of a CPU and an outer program.

FIG. 2 illustrates an interface between a procedure for calculating a quantity of usage of a CPU and another program. It is possible to update a quantity of usage of a CPU calculated by the algorithm of FIG. 1 to a registry or to access in the Windows program through an interface between an application program (win App) and a VxD or other device driver. As described above, the calculated quantity of usage of the CPU of FIG. 1 is updated continually to a memory. In the other device driver (VxD), a quantity of usage of a CPU can be gotten through an interfacing method between device drivers. In addition, a method reading a quantity of usage of a CPU directly by using the application program and device I/O control can be used.

As described above, the method for measuring the quantity of usage of the CPU in accordance with the present invention can measure a quantity of usage of a CPU with higher confidence by using various functions provided by an operating system. In addition, a power consumption in a system (computer) decreases by adjusting a clock pulse of a CPU with the method for measuring the quantity of usage of the CPU in accordance with the present invention. In addition, the method for measuring the quantity of usage of the CPU in accordance with the present invention can be adapted to various applications based on the system execution requirement, and it is very useful for an application monitoring and reporting a load of a CPU in accordance with an operation state of a system.

In addition, because the method for measuring a quantity of usage of a CPU in accordance with the present invention is embodied in a device driver (VxD) level, control of a system is useful. In addition, because the method for measuring a quantity of usage of a CPU in accordance with the present invention uses a basic service provided from MS-Windows, there is no need to amend an algorithm in order to adapt it for the other MS-Windows nor does it require a complicated code, and the present invention can measure a quantity of usage of a CPU simply, and without lowering performance of the MS-Windows system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for measuring a quantity of usage of a CPU in a system, comprising:

identifying a system thread identifier;

comparing subsequent thread identifiers to the system thread identifier;

reading execution time of all threads excluding the system thread until a predetermined event occurs;

adding the read execution times;

subtracting a total of execution time of a former stored thread from the a total time of the added execution times; and measuring a quantity of usage of a CPU by dividing the subtracted execution time of the thread by a time period determined by the predetermined event.

2. The method for measuring the quantity of usage of the CPU according to claim 1, wherein the predetermined event is time-out of a predetermined timer time interval, and wherein the quantity of usage of the CPU is compensated by finding an average value between the former quantity of usage of the CPU and the present measured quantity of usage of the CPU when the quantity of usage of the CPU varies suddenly due to the predetermined timer time interval.

3. The method for measuring the quantity of usage of the CPU according to claim 2, wherein the predetermined timer time interval is not greater than 10 seconds.

4. The method for measuring the quantity of usage of the CPU according to claim 2, wherein the present measured quantity of usage of the CPU is maintained as it is when the quantity of usage of the CPU does not vary suddenly.

5. The method for measuring the quantity of usage of the CPU according to claim 2, wherein the present measured quantity of usage of the CPU is maintained as it is when the quantity of usage of the CPU varies suddenly.

6. The method for measuring the quantity of usage of the CPU according to claim 1, wherein the adding process further comprises reading all the threads excluding the system thread sequentially after reading the system thread.

7. The method for measuring the quantity of usage of the CPU according to claim 1, wherein the identifier is a thread handle.

8. The method for measuring the quantity of usage of the CPU according to claim 1, wherein the predetermined event is time expiration of a timer or receiving the system thread identifier.

9. The method for measuring the quantity of usage of the CPU according to claim 1, wherein the time period is a predetermined timer time or an ending execution time of the system thread.

10. A method for measuring CPU usage, comprising:

(a) reading an execution time of a threads over a time interval;

(b) adding the execution times of threads that are not a system thread to obtain a grand total;

(c) reading a total execution time for a previously stored thread;

(d) subtracting the total execution time for the previously stored thread from the grand total to obtain a result; and (e) outputting the result.

11. The method as set forth in claim 10, further comprising dividing the result by the time interval, to yield a usage percentage.

12. The method as set forth in claim 10, wherein the time interval does not exceed 10 seconds.

13. The method as set forth in claim 10, further comprising compensating the CPU usage by an amount indicative of a previous average usage.

14. The method as set forth in claim 10, further comprising outputting the total execution time to the register for CPU usage.

15. The method as set forth in claim 10, further comprising outputting the total execution time for availability to device drivers.

16. The method as set forth in claim 10, wherein the previously stored thread is a previous system thread.

17. The method as set forth in claim 16, wherein the step of adding execution times continues until the grand total minus the total execution time of the previously stored system thread substantially agrees with the new system thread total execution time.

18. The method according to claim 16, wherein the adding step further comprises adding the execution times of all threads excluding the system thread, sequentially after the system thread.

19. The method according to claim 16, further comprising repeating steps (a)–(e) until a function for measuring the CPU usage or the CPU is disabled.

20. The method according to claim 16, wherein the reading of the executing time is performed by an I/O device driver command.

21. The method according to claim 16, further comprising adjusting a clock pulse of the CPU in response to the grand total of execution times.

22. A method for measuring a quantity of usage of a CPU, comprising:

reading execution time of threads during a predetermined timer time interval and adding execution time values for each thread that is not a system thread to get a first total;

subtracting a total of execution time of a former stored thread from the first total; and measuring a quantity of usage of a CPU by dividing the subtracted execution time by the predetermined timer time.

23. The method for measuring the quantity of usage of the CPU according to claim 22, wherein the quantity of usage of the CPU is compensated by finding an average value between former measured quantities of usage of a CPU and a present measured quantity of usage of a CPU when the quantity of usage of the CPU suddenly varies.

24. The method for measuring the quantity of usage of the CPU according to claim 23, wherein the predetermined time timer interval is not greater than 10 seconds.

25. The method for measuring the quantity of usage of the CPU according to claim 23, wherein the present measured quantity of usage of the CPU is maintained as it is when the quantity of usage of the CPU does not vary suddenly.

26. The method for measuring the quantity of usage of the CPU according to claim 23, wherein the present measured quantity of usage of the CPU is maintained as it is when the quantity of usage of the CPU varies suddenly.

27. The method for measuring the quantity of usage of the CPU according to claim 22, wherein the reading process comprises:

identifying a current thread; and comparing the identified thread to the system thread.

28. The method for measuring the quantity of usage of the CPU according to claim 27, wherein the adding process further comprises reading all the threads excluding the system thread sequentially after reading the system thread.

29. A method, comprising:

initializing a timer and a subtotal;

identifying a handle of a system thread;

starting the timer;

reading an execution time of a next thread that is not the system thread;

adding the execution time of the read next thread to the subtotal;

repeating the reading and the adding steps until the timer reaches a prescribed value;

subtracting a previously stored thread value from the subtotal to get a result;

dividing the result by the timer prescribed value;

storing the subtotal as the previously stored value;

outputting the usage value; and repeating the initializing through storing until a CPU monitoring function is disabled.

* * * * *